US008580137B2

(12) United States Patent
Chen et al.

(10) Patent No.: US 8,580,137 B2
(45) Date of Patent: *Nov. 12, 2013

(54) TRANS-1,2-DICHLOROETHYLENE WITH FLASH POINT ELEVATED BY 1-CHLORO-3,3,3-TRIFLUOROPROPENE

(75) Inventors: Benjamin Bin Chen, Wayne, PA (US); Philippe Bonnet, Lyons (FR)

(73) Assignee: Arkema Inc., King of Prussia, PA (US)

( * ) Notice: Subject to any disclaimer, the term of this patent is extended or adjusted under 35 U.S.C. 154(b) by 106 days.

This patent is subject to a terminal disclaimer.

(21) Appl. No.: 13/145,574

(22) PCT Filed: Jan. 13, 2010

(86) PCT No.: PCT/US2010/020838
§ 371 (c)(1),
(2), (4) Date: Sep. 7, 2011

(87) PCT Pub. No.: WO2010/085397
PCT Pub. Date: Jul. 29, 2010

(65) Prior Publication Data
US 2011/0309287 A1    Dec. 22, 2011

Related U.S. Application Data

(60) Provisional application No. 61/146,365, filed on Jan. 22, 2009.

(51) Int. Cl.
*C09K 5/04* (2006.01)

(52) U.S. Cl.
USPC ................ 252/67; 521/99; 222/635; 510/371

(58) Field of Classification Search
USPC ................ 252/67; 222/635; 510/371; 521/99
See application file for complete search history.

(56) References Cited

U.S. PATENT DOCUMENTS

| | | | |
|---|---|---|---|
| 5,066,418 A | 11/1991 | Merchant | |
| 5,196,137 A | 3/1993 | Merchant | |
| 5,759,986 A | 6/1998 | Merchant et al. | |
| 5,827,812 A | 10/1998 | Flynn et al. | |
| 6,699,829 B2 | 3/2004 | Doyel et al. | |
| 6,759,381 B1 | 7/2004 | Johnson et al. | |
| 6,793,840 B2 | 9/2004 | Shin et al. | |
| 6,852,684 B1 | 2/2005 | Westbrook et al. | |
| 6,858,571 B2 | 2/2005 | Pham et al. | |
| 7,429,557 B2 | 9/2008 | Grzyll et al. | |
| 7,442,321 B1 * | 10/2008 | Chen et al. | 252/68 |
| 7,935,268 B2 * | 5/2011 | Basu et al. | 252/67 |
| 2005/0245421 A1 | 11/2005 | Singh et al. | |
| 2008/0060687 A1 | 3/2008 | Schweitzer et al. | |
| 2008/0313985 A1 | 12/2008 | Duncan | |
| 2009/0253820 A1 * | 10/2009 | Bowman et al. | 521/170 |
| 2009/0305876 A1 * | 12/2009 | Singh et al. | 502/150 |

OTHER PUBLICATIONS

Osha, "Occupational Safety and Health Guidlines for 1,2-dichloroethylene", US Department of Labor, May 17, 2008, p. 2.

* cited by examiner

*Primary Examiner* — John Hardee
(74) *Attorney, Agent, or Firm* — Steven D. Boyd

(57) ABSTRACT

A trans-1,2-dichloroethylene blend which comprises a combination of a major amount of trans-1,2-dichloroethylene and a minor amount of a hydrohaloolefin having an elevated flash point is disclosed The combination exhibits a flash point significantly higher than trans-1,2-dichloroethylene alone The preferred hydrohaloolefin is 1-chloro-3,3,3-trifluoropropene (HCFO-1233zd) The subject blends find application as heat transfer agents, propellants and sprayable compositions, blowing agents, solvents and cleaning agents.

7 Claims, No Drawings

TRANS-1,2-DICHLOROETHYLENE WITH FLASH POINT ELEVATED BY 1-CHLORO-3,3,3-TRIFLUOROPROPENE

FIELD OF THE INVENTION

The present invention relates to compositions of predominantly trans-1,2-dichloroethylene having suppressed or elevated flash point. More particularly, the present invention relates to tran-1,2-dichloroethylene in combination with a minor amount of a hydrochlorofluorocarbon wherein the combination exhibits a flash point significantly higher than that of trans-1,2-dichloroethylene alone.

BACKGROUND OF THE INVENTION

In the production of foams, including polyurethane, agents such as hydrochlorofluorocarbons (HCFCs), hydrofluorocarbons (HFCs) etc are employed as foaming agents. These materials also find use as cleaning agents or solvents and refrigerants. Various chemicals are included in foam or polyol premixes. These chemicals can include polyols, catalysts, surfactants, fire retardants, etc. Trans-1,2-dichloroethylene (TDCE) is a known agent employed in foam production and in cleaning agent, solvent and refrigerant applications.

Handling of Trans-1,2-dichloroethylene or TDCE is problematic because of its relatively low flash point of −10° C. Flash point as used herein relates to flash point as measured using a Setaflash "series 7" flash point tester. Current United States Department of Transportation regulations designate liquids having a flash point less of than 60° C. as flammable for transportation purposes. Thus, transportation of TDCE such as for use in foam production is problematic.

Prior methods to provide "non-flammable" TDCE have focused on mixing it with a large quantity non-flammable compound having a volatility similar to TDCE. Furthermore, prior methods relied upon forming azeotrope blends of TDCE and other components to suppress (raise) the flash point. For example Novec™ engineered fluid HFE-71DE available from Minnesota Mining and Manufacturing Co. comprises an azeotropic blend of TDCE and 1-(Methoxy)nonafluorobutane ($C_4F_9OCH_3$). The blend consists of 50% by weight of 1-(Methoxy)nonafluorobutane. This blend is non-flammable and has no flash point. Such prior methods resulted in adding an additional volatile compound or compounds to TDCE which compounds can become incorporated into the foam produced with the mixture. Similarly, a product (Vertrel® MCA) available from DuPont is an azeotropic blend consisting of about 62% by weight of 1,1,1,2,2,3,4,5,5,5-decafluoropentance (HFC-4310mee) and about 38% by weight of TDCE.

U.S. Pat. No. 5,759,986 discloses an azeotropic or azeotropic like composition of 40 to 70% by weight 1,1,1,2,2,3,4,5,5,5-decafluoropentane (HFC-4310mee), 15-50% TDCE, 1-25% cyclopentane and 1-10% methanol or 35-75% by weight HFC-4310mee, 10-50% TDCE and 5-25% cyclopentane. No specific mention is made of flash point or boiling point for the described azeotropic or azeotropic like composition. The use of significant proportions of volatile compounds such as HFC-4310mee, adds to the global warming potential (GWP) of the mixture. These results are undesirable.

U.S. Pat. No. 5,196,137 discloses an azeotropic mixture of 1,1,1,2,3,4,4,5,5,5-decafluoropentane (HFC-4310mee) and trans-1,2-dichloroethylene, cis-1,1-diehloroethylene or 1,1-dichloroethane. The disclosed azeotropic mixture of HFC-4310mee and TDCE consists essentially of 58 to 68 weight percent HFC-4310mee and 32 to 42 weight percent TDCE. The use of a significant proportion of volatile compounds such as HFC-4310mee, adds to the global warming potential (GWP) of the mixture. These results are undesirable.

U.S. Pat. No. 5,827,812 discloses azeotrope or azeotrope like compositions including a composition consisting essentially of about 25 to 83 weight percent TDCE and about 75 to 17 weight percent perfluorobutyl methyl ether. The use of a significant proportion of volatile compounds such as perfluorobutyl methyl ethers, adds to the global warming potential (GWP) of the mixture. These results are undesirable.

U.S. Pat. No. 6,793,840 discloses a binary azeotropic composition of 3,3,4,4,5,5,6,6,6-nonafluoro-1-hexene and TDCE, which consists of 30.7 mole % of 3,3,4,4,5,5,6,6,6-nonafluoro-1-hexene and 69.3 mole % of TDCE. This composition is equivalent to 52.9% by weight of 3,3,4,4,5,5,6,6,6-nonafluoro-1-hexene. Again, a higher proportion of 3,3,4,4,5,5,6,6,6-nonafluoro-1-hexene in the blend is undesirable.

BRIEF SUMMARY OF THE INVENTION

Compositions comprising as a major portion TDCE having a suppressed or elevated flash point are provided. The compositions allow for easier and safer handling and transportation of TDCE for use such as in foam production, cleaning/solvent applications, heat transfer applications, aerosol/propellant applications etc. In addition, the compositions have lower global warming potential than those azeotropic blends, which consist of a large percentage of high global warming potential substances such as 1,1,1,2,2,3,4,5,5,5-decafluoropentance or 1-(Methoxy) nonafluorobutane. The compositions comprise a minor amount of a hydrochlorofluoroolefins and a major amount of TDCE. It was discovered that such compositions exhibit a flash point significantly higher than TDCE alone. The preferred hydrochlorofluoroolefin is 1-chloro-3,3,3-trifluoropropene (HCFO-1233zd). Flash points of greater than 48° C. (the boiling point of pure TDCE) or higher are possible with the addition of only minor amounts of such hydrochlorofluoroolefins to TDCE.

DETAILED DESCRIPTION

It has been discovered that the flash point of TDCE can be suppressed or elevated above 48° C. (the boiling point of pure TDCE) by mixing TDCE with minor amounts of 1-chloro-3,3,3-trifluoropropene (HCFO-1233zd). The amount of 1-chloro-3,3,3-trifluoropropene (HCFO-1233zd) added to TDCE to achieve the desired flash point of 48° C. or above is as low as 2.5% by weight, preferably greater than 5% by weight and can be as high as 31% by weight. Since both HCFO-1233zd and TDCE have low global warming potential, the composition should have low global warming potential as well. A minor amount of HCFO-1233zd is beneficial particularly in which applications require TDCE as a major component.

TDCE is an additive used in polyurethane foam production that provides processibility enhancements, smoke generation suppression etc. The mixture of TDCE and 1-chloro-3,3,3-trifluoropropene (HCFO-1233zd) of the present invention provides a means of transporting and handling TDCE in a less hazardous combination. The mixture is useful in the production of foams such as polyurethane foams as well as in cleaning agent/solvent applications, in heat transfer applications and aerosol/propellant applications. The present invention provides a means for transporting and handling TDCE in a less hazardous, non-flammable condition for such uses.

Other uses of the present compositions include use as solvents, cleaning agents, and the like. Examples include vapor degreasing, defluxing, precision cleaning, electronics cleaning, drying cleaning, solvent etching cleaning, carrier solvents for depositing lubricants and release agents, and other solvent or surface treatment. Those of skill in the art will be readily able to adapt the present compositions for use in such applications without undue experimentation.

The present invention is illustrated in more detail in the following non-limiting examples.

EXAMPLES

The flash point measurements of trans-1,2-DCE (TDCE) alone and in blends with 1-chloro-3,3,3-trifluoropropene (1233zd) were conducted using a Setaflash "series 7" flash point tester available from Petroleum Systems Services Corporation. The test was conducted according to ASTM D3 878-96 "Standard Test Methods for Flash Point of Liquids by Small Scale Closed Cup Tester". The equilibrium mode was used to obtain the flash point.

Example 1

2 ml of TDCE was loaded into the cell at 0° C., and then the cell temperature was rapidly ramped up or down to desired temperatures. Flash point was measured at each desired temperature 2 to 3 times. Fresh samples were loaded for each temperature point. The flash point of TDCE was determined at −10° C., which is consistent in the literature.

TABLE 1

TDCE Flash Point Determination

| Test Temperature (° C.) | Flash Point |
|---|---|
| −29 | No |
| −25 | No |
| −20 | No |
| −15 | No |
| −12 | No |
| −10 | Yes |

Example 2

Blends of 1233zd and TDCE were prepared based on wt % by methods known to those skilled in the art. The flash point of each composition was measured at each temperature as described as the above.

TABLE 2

TDCE and 1233zd Blends Flash Point

| Test Temperature (° C.) | Flash Point of 1233zd/TDCE (wt %) | | | | |
|---|---|---|---|---|---|
| | 1/99 | 2/98 | 2.5/97.5 | 3/97 | 4/96 |
| −29 | No | No | No | No | No |
| −25 | No | No | No | No | No |
| −20 | No | No | No | No | No |
| −15 | No | No | No | No | No |
| −12 | No | No | No | No | No |
| −10 | Yes | Yes | No | No | No |
| 0 | NA | NA | No | No | No |
| 10 | NA | NA | No | No | No |
| 20 | NA | NA | No | No | No |
| 30 | NA | NA | No | No | No |
| 40 | NA | NA | No | No | No |
| 45 | NA | NA | No | No | No |

While the present invention has been described with respect to particular embodiments thereof, it is apparent that numerous other forms and modifications of this invention will be obvious to those skilled in the art. The appended claims and this invention generally should be construed to cover all such obvious forms and modifications that are within the true spirit and scope of the present invention.

What is claimed is:

1. A method for increasing the flash point of trans-1,2-dichloroethylene comprising blending greater than 2.5% and less than about 5% by weight 1-chloro-3,3,3-trifluoropropene with trans-1,2-dichloroethylene to result in a combination which exhibits no flash point from −29° C. to 45° C.

2. The method of claim 1 wherein the flash point of said blend is above about 45° C.

3. A method for transferring heat which comprises condensing a heat transfer composition comprising from about 95% to about 97.5% by weight tran-1,2-dichloroethylene and from about 2.5% to about 5% by weight 1-chloro-3,3,3-trifluoropropene and thereafter evaporating said heat transfer composition.

4. A sprayable composition comprising a material to be sprayed and a propellant comprising from about 95% to about 97.5% by weight tran-1,2-dichloroethylene and from about 2.5% to about 5% by weight 1-chloro,3,3,3-trifluoropropene.

5. The sprayable composition of claim 4 wherein said composition is an aerosol.

6. A blowing agent comprising from about 95% to about 97.5% by weight tran-1,2-dichloroethylene and from about 2.5% to about 5% by weight 1-chloro-3,3,3-trifluoropropene.

7. A solvent or cleaning agent comprising from about 95% to about 97.5% by weight tran-1,2-dichloroethylene and from about 2,5% to about 5% by weight 1-chloro-3,3,3-trifluoropropene.

* * * * *